2,783,850

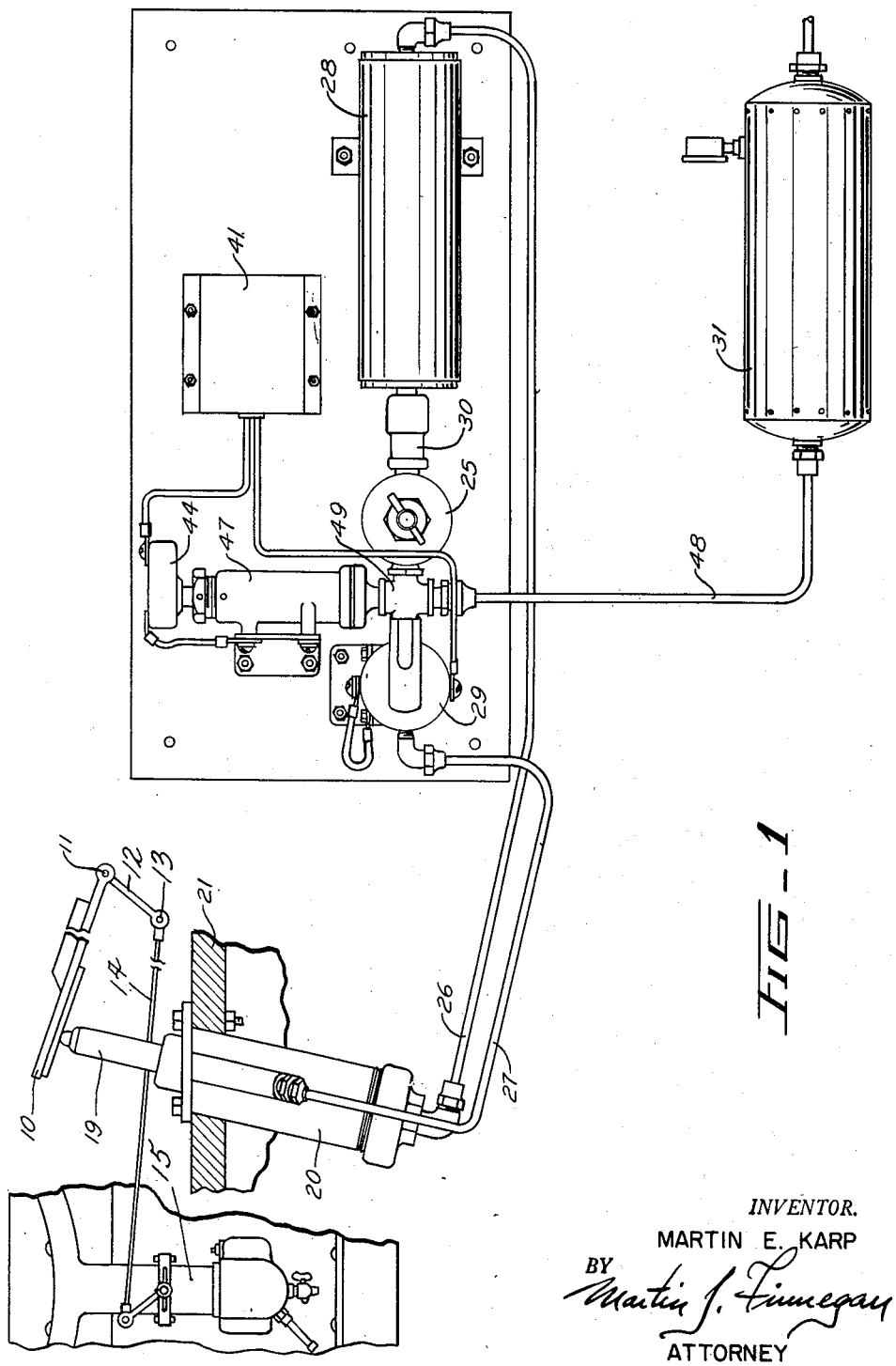

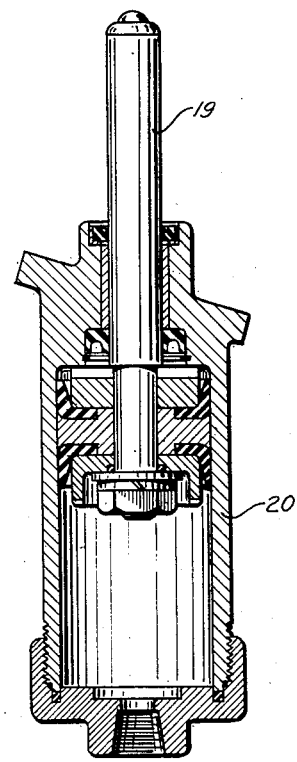
FIG_2
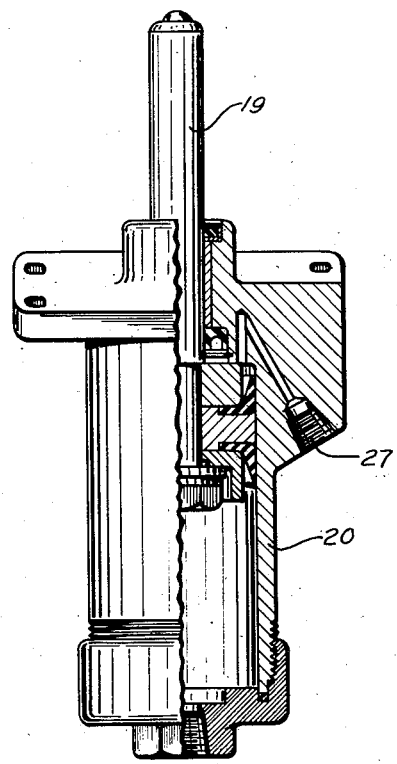
FIG_3
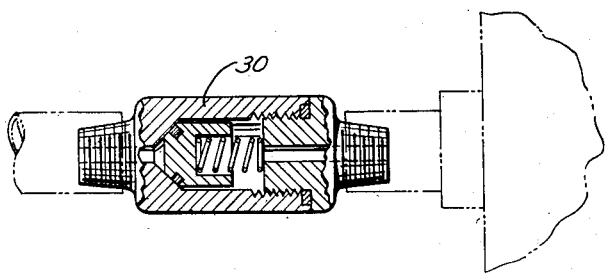
FIG_4
INVENTOR.
MARTIN E. KARP
BY Martin J. Finnegan
ATTORNEY March 5, 1957 M. E. KARP 2,783,850
VEHICLE SAFETY CONTROL SYSTEM
Filed April 2, 1952 5 Sheets-Sheet 3
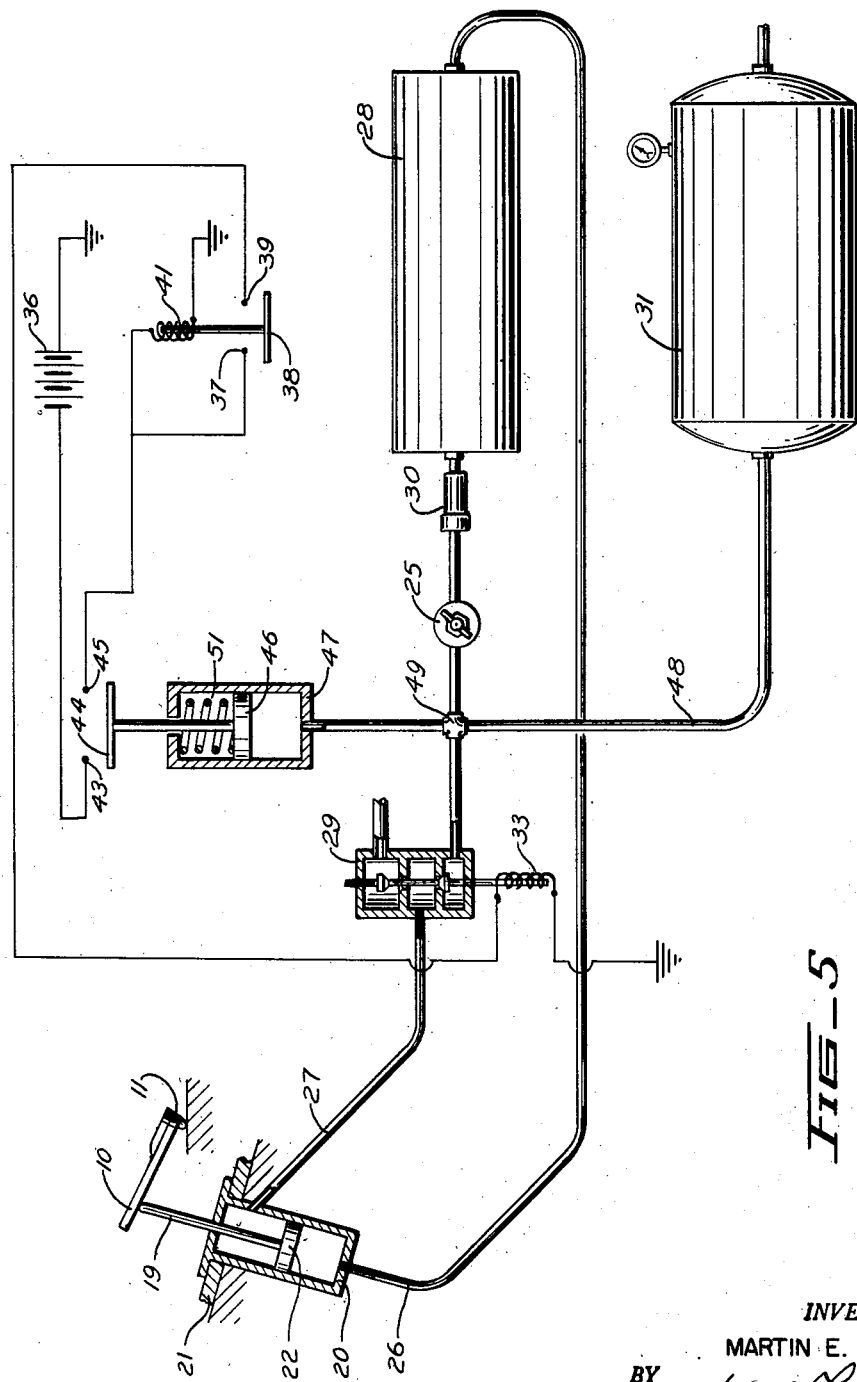
INVENTOR.
MARTIN E. KARP
BY
ATTORNEY March 5, 1957 M. E. KARP 2,783,850
VEHICLE SAFETY CONTROL SYSTEM
Filed April 2, 1952 5 Sheets-Sheet 4
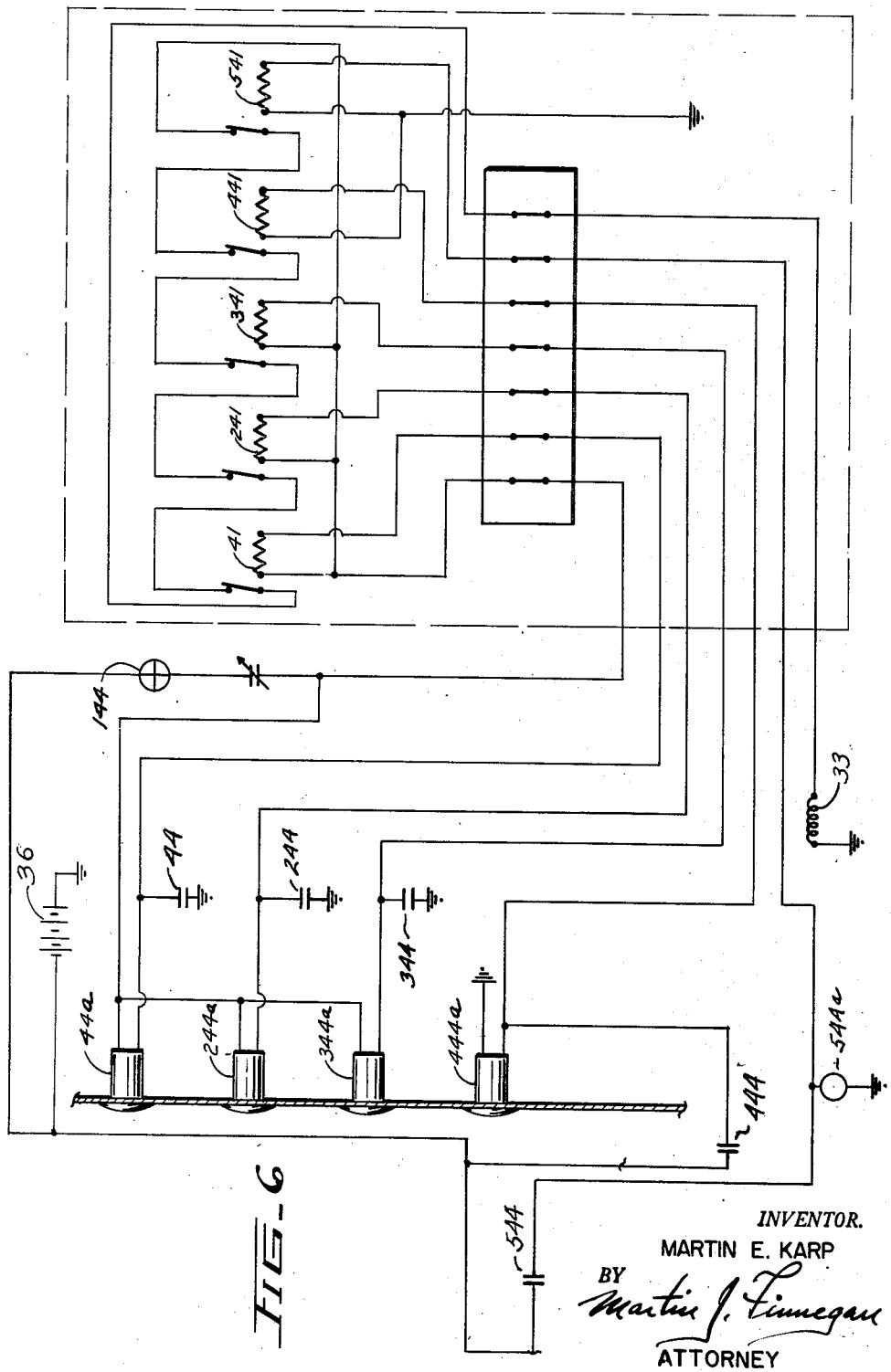
INVENTOR.
MARTIN E. KARP
BY
ATTORNEY March 5, 1957 M. E. KARP 2,783,850
VEHICLE SAFETY CONTROL SYSTEM
Filed April 2, 1952 5 Sheets-Sheet 5
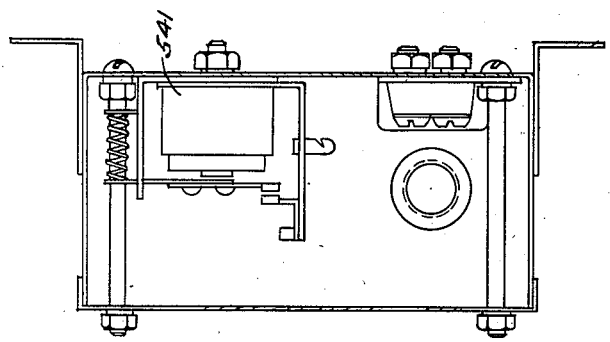
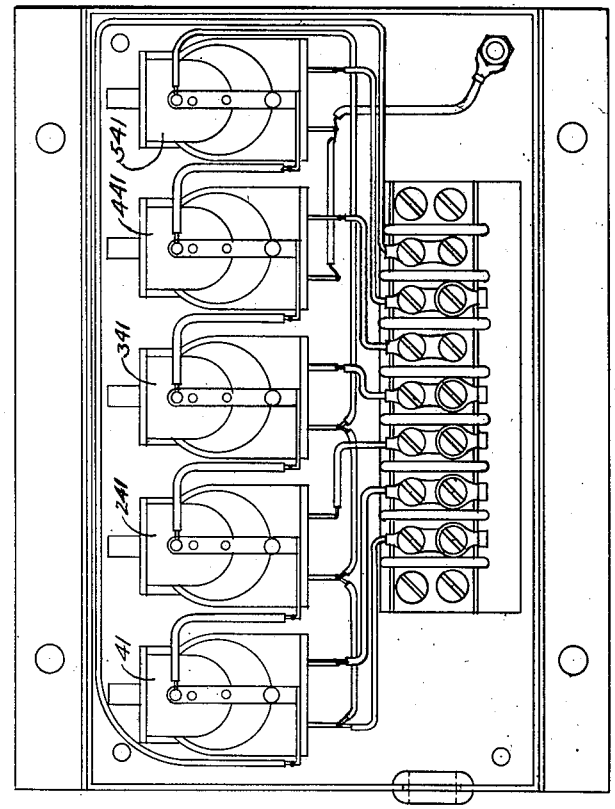
INVENTOR.
MARTIN E. KARP
BY
*Martin J. Finnegan*
ATTORNEY

United States Patent Office 2,783,850
Patented Mar. 5, 1957

VEHICLE SAFETY CONTROL SYSTEM

Martin E. Karp, Newton Center, Mass., assignor to National Pneumatic Co., Inc., Boston, Mass., a corporation of Delaware Application April 2, 1952, Serial No. 280,090

7 Claims. (Cl. 180—82)

This invention relates to the control of engines and more particularly to the control of the propelling engine of a vehicle.

In the operation of motor vehicles, and particularly vehicles of the heavier type such as buses and trucks, wherein operation of the brakes is dependent upon air pressure, it is important that the vehicle be not operated until sufficient air is available to control it. It is also desirable that operation be prevented wherever engine oil pressure, or temperature, is not at a safe operating point.

It is an object of my invention to provide a novel control means adapted to affect the movability of the power applying instrument of a motor vehicle and thereby render operation of the vehicle difficult, but not impossible, when the engine is cold, when the temperature is too high, when air pressure falls below a safety level, when the oil pressure drops below a predetermined minimum, when a vehicle door is open, or when the engine speed or vehicle speed exceeds a predetermined maximum. Other objects of the invention will become apparent upon reference to the following description of the invention in terms of the embodiment illustrated in the accompanying drawings wherein:

Fig. 1 is a diagrammatic representation of the invention as applied to the control of the accelerator pedal of an automotive vehicle;

Fig. 2 is a central sectional view of one of the piston and cylinder assemblies utilized in the system illustrated in Fig. 1;

Fig. 3 is a second sectional view of the piston and cylinder assembly of Fig. 2, the view being taken at right angles to the view point of Fig. 2;

Fig. 4 is a sectional view of another element utilized in the system illustrated in Fig. 1;

Fig. 5 is a schematic representation of the electrical and fluid pressure connections and parts utilized in the system illustrated in Fig. 1;

Fig. 6 is a schematic diagram of a system comparable to that of Fig. 1 but including additional control elements adapted to make the system responsive to additional conditions attendant upon vehicle operation;

Fig. 7 is a view in elevation of a relay and terminal housing suitable for the electrical element shown in Fig. 6; and Fig. 8 is an end view of the relay and terminal housing of Fig. 7.

In Fig. 1 reference numeral 10 designates an accelerator pedal pivoted at 11 and having an arm 12 pivoted at 13 to a link 14 extending to the carburetor 15 to control flow of fluid to the engine in the conventional manner. A cylinder 20 is mounted on a suitable support 21 and contains a piston 22 and a piston rod 19 of sufficient length to press against the under side of accelerator pedal 10 when air pressure conditions on opposite sides of the piston 22 are such as to bias the piston to its upper position. Conduits 26 and 27 lead to opposite ends of cylinder 20. Conduit 26 originates at tank 28, in which air is stored by means hereinafter described, while conduit 27 originates at valve unit 29 which is one of a pair of valve units 25, 29 controlling flow of air from the main reservoir 31 to the units 20 and 28, respectively.

Operation of valve 29 is controlled by solenoid 33 and the circuit thereto, which circuit includes current source 36, switches 44 and 38, and the windings of solenoid 33. Switch 38 is adapted to close when relay winding 41 receives current, and this occurs when switch 44 closes; the latter switch being operated by the plunger 46 of cylinder 47. Air is supplied to cylinder 47 by way of conduit 48 and junction fitting 49.

It will be appreciated that as long as the pressure in the reservoir 31 is below a safe minimum the switches 44 and 38 will remain open, hence valve 29 will remain in its upper position (to which it is biased by spring pressure), preventing air flow from the tank 31 into the upper side of cylinder 20. Hence there will be no pressure above the piston 22 to oppose the upward pressure exerted on the piston by the air supplied to the lower chamber of the cylinder from control reservoir 28 by way of conduit 26. As a result there will be substantial pressure against the under side of the accelerator pedal, and the operator, in order to depress the pedal, will have to push hard enough to overcome this air pressure in the lower chamber of cylinder 20.

It will thus be forcibly brought to the operator's attention that something is wrong, since it will be necessary for him to exert exceptionally heavy pressure upon the accelerator pedal in order to operate the vehicle. By the same token, the vehicle need not be entirely immobile since it will be possible for the operator to achieve some slight pedal motion, if his effort is sufficiently great.

Eventually, upon introduction into the reservoir 31 of sufficient air to raise the pressure to the safe minimum value, the resultant increase of pressure in cylinder 47, below the piston 46, will move piston 46 upwardly overcoming spring 51 to cause bridging element 44 to make contact with switch terminals 43 and 45, energizing relay 41 and thereby causing current to flow from source 36 to solenoid 33. This energization of solenoid 33 will move valve 29 to its lower position, thereby permitting the air under pressure in reservoir 31 to pass into the conduit 27 and thence into cylinder 20, above the piston 22. This action establishes an overbalanced condition above the piston 22, and upon attainment of such a pressure differential there is a release of all restraint against the under side of the accelerator pedal 10.

Unit 25 (Figs. 1 and 5) is a pressure regulator to permit adjustment of the pressure to be built up in the accumulator 28; it being intended to maintain such pressure at a value considerably lower than that which may develop in the reservoir 31 when the latter is fully charged. Unit 30 is a one-way valve (check valve) permitting air to enter the accumulator 28, but blocking reverse flow, during any period when the pressure in reservoir 31 is below the regulated value.

Air stored in the accumulator 28 may at all times enter freely into conduit 26 and thence into the lower chamber of cylinder 20. Hence the lower side of piston 22 is always subjected to pressure of a constant magnitude, as determined by the setting of pressure regulator 25; this remains true at all times, including the intervals when the vehicle may be out of actual use, during which intervals there may be depletion of air in reservoir 31, but no such depletion in accumulator 28, due to the pressure-retaining function of check valve 30.

Thus the accumulator 28 and the conduit 26 leading from there to the lower portion of the cylinder 20 comprise a first fluid pressure means which constantly admits fluid under pressure to the cylinder 20 below the piston 22 to move the piston to its upper position. The reservoir 31, together with the pressure actuated piston 46, the switch 43, 44, 45, the solenoid 33, the valve 29, the conduit 48, the junction fitting 49, and the conduit 27 comprise a second fluid pressure means which is effective to apply an over-powering counter-pressure within the cylinder 20 above the piston 22, that second fluid pressure means being sensitive to the pressure in the reservoir 31 and effective to apply said over-powering pressure above the piston 22 when the pressure in the reservoir 31 reaches a predetermined value sufficient to move the piston 46 upwardly so as to close the switch 43, 44, 45.

In Fig. 6 a plurality of control units indicated, with each unit being electrically connected to a relay unit in the same manner as control unit 44 of Fig. 5 is electrically connected to relay unit 41 of Fig. 5—and for the same purpose, namely, to control the supplying and interruption of current to solenoid 33.

The entire series of relay units—41, 241, 341, 441, and 541—may be mounted side by side in a single housing, include, in addition to the air pressure unit 44, a temperature unit 244, an oil pressure unit 344, door control unit 444, and an emergency door control unit 544; with each unit being adapted to control flow of current from source 36 to its associated relay of the relay assembly. With this arrangement, a faulty condition or systemic deficiency at any key point in the vehicle's equipment will result in de energization of solenoid 33, with consequent fluid pressure loading of the plunger rod 19 to a degree that will forcibly impress upon the operator (through the reaction communicated to him by way of the accelerator pedal) the existence of the faulty condition. At the same time continued operation of the vehicle will become extremely burdensome, due to this fluid pressure loading of the accelerator pedal in a direction opposite to that in which the operator's effort is applied. Such opposition will continue until the faulty condition is corrected, and will then cease automatically, as has been indicated.

In the circuit arrangement illustrated in Fig. 6, each of the units 44 to 544 has an associated indicator element, as shown at 44a, 244a, 344a, 444a and 544a. Certain of the circuit branches are in series with the ignition switch 144, while others (namely, the door control units) are not, as the latter controls are required to function independently of the ignition key.

What I claim is:

1. In combination with an accelerator pedal, means for interposing an obstruction to avoid depression of said pedal, said means including a cylinder, a piston having a piston rod connected thereto and extending from said cylinder, first fluid pressure means constantly admitting fluid under pressure to said cylinder to move said piston in a direction to cause said rod to exert pressure against said pedal, a first fluid pressure reservoir, and second fluid pressure means sensitive to the pressure in said first reservoir and effective to apply an overpowering counter-pressure to the opposite side of said piston when the pressure in said first reservoir reaches a predetermined value so as to move said piston in a direction to cause said rod to relieve its pressure against said pedal, said first fluid pressure means comprising a second fluid pressure reservoir operatively connected to said first fluid pressure reservoir via a pressure regulating and holding means so as to be charged by said first reservoir when the pressure in said first reservoir has a value exceeding that in said second reservoir by a given amount and to retain its pressure when the pressure in said first reservoir falls below said value.

2. The combination of claim 1, in which said first reservoir is operatively connected to said cylinder so as to define, in part, said second fluid pressure means, said overpowering counter-pressure being derived from said first reservoir.

3. The combination of claim 1, in which said first reservoir is operatively connected to said cylinder so as to define, in part, said second fluid pressure means, said overpowering counter-pressure being derived from said first reservoir, the predetermined value of the pressure in said first reservoir necessary to actuate said second fluid pressure means to apply said counter-pressure being greater than the pressure to which said second reservoir is charged.

4. In combination with an accelerator pedal mounted above a floorboard for movement toward and away from said floorboard between upper and lower positions respectivley, a cylinder beneath said accelerator and fixed with respect to said floorboard, a piston in said cylinder, a piston rod secured to said piston extending up from said cylinder and movable between lower and upper positions in which its tip is below and above the lower position of said accelerator respectively and within the path of movement of said accelerator, first fluid pressure means constantly admitting fluid under pressure to said cylinder below said piston to move said piston to its upper position, a first fluid pressure reservoir, second fluid pressure means sensitive to the pressure in said first reservoir and effective to apply an overpowering counter-pressure within asid cylinder above said piston so as to move said piston to its lower position when the pressure in said first reservoir reaches a predetermined value, said first fluid pressure means comprising a second fluid pressure reservoir operatively connected to said first fluid pressure reservoir via a pressure regulating and holding means so as to be charged by said first reservoir when the pressure in said first reservoir has a value exceeding that in said second reservoir by a given amount and to retain its pressure when the pressure in said first reservoir falls below said value.

5. In combination with an accelerator pedal mounted above a floorboard for movement toward and away from said floorboard between upper and lower positions respectively, a cylinder beneath said accelerator and fixed with respect to said floorboard, a piston in said cylinder, a piston rod secured to said piston extending up from said cylinder and movable between lower and upper positions in which its tip is below and above the lower position of said accelerator respectively and within the path of movement of said accelerator, first fluid pressure means constantly admitting fluid under pressure to said cylinder below said piston to move said piston to its upper position, a first fluid pressure reservoir, second fluid pressure means sensitive to the pressure in said first reservoir and effective to apply an overpowering counter-pressure within said cylinder above said piston so as to move said piston to its lower position when the pressure in said first reservoir reaches a predetermined value, said first reservoir being operatively connected to said cylinder so as to define, in part, said second fluid pressure means, said overpowering counter-pressure being derived from said first reservoir.

6. The combination of claim 4, in which said first reservoir is operatively connected to said cylinder so as to define, in part, said second fluid pressure means, said overpowering counter-pressure being derived from said first reservoir.

7. The combination of claim 4, in which said first reservoir is operatively connected to said cylinder so as to define, in part, said second fluid pressure means, said overpowering counter-pressure being derived from said first reservoir, the predetermined value of the pressure in said first reservoir necessary to actuate said second fluid pressure means ot apply said counter-pressure being greater than the pressure to which said second reservoir is charged.

References Cited in the file of this patent

UNITED STATES PATENTS

| 1,906,699 | Mallison et al. | May 2, 1933 |
| 2,010,960 | Pogue | Aug. 13, 1935 |
| 2,248,747 | Dick | July 8, 1941 |
| 2,459,938 | Higgins | Jan. 25, 1949 |
| 2,519,859 | Teetor | Aug. 22, 1950 |
| 2,527,177 | Dach | Oct. 24, 1950 |
| 2,649,169 | Holman | Aug. 18, 1953 |

FOREIGN PATENTS

| 605,274 | Great Britain | July 20, 1948 |

(Corresponding U. S. 2,474,232, June 28, 1949)